US012760833B2

(12) United States Patent
Yin

(10) Patent No.: US 12,760,833 B2
(45) Date of Patent: Oct. 13, 2026

(54) GIMBAL LOCKING STRUCTURE AND GIMBAL

(71) Applicant: Fotopro (Guangdong) Image Industrial Co., Ltd., Zhongshan (CN)

(72) Inventor: Huibin Yin, Guangdong (CN)

(73) Assignee: Fotopro (Guangdong) Image Industrial Co., Ltd., Zhongshan (CN)

( * ) Notice: Subject to any disclaimer, the term of this patent is extended or adjusted under 35 U.S.C. 154(b) by 269 days.

(21) Appl. No.: 18/433,485

(22) Filed: Feb. 6, 2024

(65) Prior Publication Data

US 2025/0251078 A1 Aug. 7, 2025

(51) Int. Cl.
*F16M 11/14* (2006.01)
*F16M 11/20* (2006.01)

(52) U.S. Cl.
CPC ......... *F16M 11/2078* (2013.01); *F16M 11/14* (2013.01); *F16M 2200/022* (2013.01)

(58) Field of Classification Search
CPC ............... F16M 11/14; F16M 11/2078; F16M 2200/022; Y10T 403/32311; Y10T 403/32196
USPC ....................................................... 248/181.1
See application file for complete search history.

(56) References Cited

U.S. PATENT DOCUMENTS 5,505,415 A * 4/1996 Brett ...................... F16M 11/16 248/168
7,300,028 B2 * 11/2007 Vogt ...................... F16M 11/14 403/114
8,414,202 B2 * 4/2013 Li .......................... F16M 11/14 396/428
9,297,409 B2 * 3/2016 Kallas .................. F16M 11/041
11,353,781 B2 * 6/2022 Zou ...................... F16M 11/242
11,713,844 B2 * 8/2023 Kuriyama ............ F16M 11/242 248/371
12,498,080 B2 * 12/2025 Yin ........................ F16M 11/14
12,523,337 B2 * 1/2026 Lu .......................... F16M 11/14
2006/0127167 A1 * 6/2006 Hsieh ...................... F16B 2/185 403/109.5
2024/0344652 A1 * 10/2024 Yin ........................ F16M 11/14
2025/0243965 A1 * 7/2025 Lu .......................... F16M 11/16
2025/0251078 A1 * 8/2025 Yin ...................... F16M 11/041

* cited by examiner

*Primary Examiner* — Jonathan Liu
*Assistant Examiner* — Guang H Guan

(57) ABSTRACT

A gimbal locking structure includes a rotating base, a rotating ball head, a press member, a first push member, a second push member, and a lever. A rotating chamber is provided on the rotating base. The rotating ball head is rotationally disposed inside the rotating chamber. The press member is disposed inside the rotating chamber and abuts against the rotating ball head. The first and second push members abut against the press member, a first abutting bevel is disposed on the first push member, and a second abutting bevel is disposed on the second push member. The lever is rotationally disposed on the rotating base and abuts against the first push member, and when the lever is located at a locked position, the lever pushes the first and second push members to move, to prevent the press member from moving towards the rotating ball head.

11 Claims, 3 Drawing Sheets

GIMBAL LOCKING STRUCTURE AND GIMBAL

TECHNICAL FIELD

The present disclosure relates to the field of photography gimbals, and in particular to a gimbal locking structure and a gimbal.

BACKGROUND

A gimbal is a device that carries shooting devices such as a camera. To flexibly adjust a shooting angle of a shooting device, a universal ball is usually disposed on the gimbal to adjust an angle. When the shooting device rotates to a preset angle, the universal ball is locked through a locking structure, to fix the shooting angle. A locking structure for locking a universal ball on an existing gimbal is usually a locking ring that is disposed on an outer wall of a gimbal body. The locking ring is connected to the gimbal body in a threaded manner. When the locking ring rotates, a press piece in the gimbal body is driven to abut against the universal ball, to limit rotation between the gimbal body and the universal ball. However, the locking ring needs to rotate a plurality of turns to complete locking and unlocking, which is inconvenient to use. Therefore, there is an urgent need for a gimbal locking structure and a gimbal.

SUMMARY

The present disclosure aims to solve at least one of the technical problems existing in the prior art. Therefore, the present disclosure provides a gimbal locking structure and a gimbal.

The following technical solution is adopted to resolve the technical problems in one embodiment of the present disclosure: A gimbal locking structure includes a rotating base, a rotating ball head, a press member, a first push member, a second push member, and a lever, where

- a rotating chamber is provided on the rotating base;
- the rotating ball head is rotationally disposed inside the rotating chamber;
- the press member is disposed inside the rotating chamber and abuts against the rotating ball head;
- the first push member and the second push member abut against the press member, a first abutting bevel is disposed on the first push member, and a second abutting bevel that abuts against the first abutting bevel is disposed on the second push member; and
- the lever is rotationally disposed on the rotating base and abuts against the first push member, and when the lever is located at a locked position, the lever pushes the first push member and the second push member to move, to resist movement of the press member to the rotating ball head, and press against the rotating ball head; or when the lever is located in an unlocked position, the lever stops abutting against the first push member, to enable the press member to move in a direction opposite to the rotating ball head, and stop abutting against the rotating ball head.

Preferably, an abutting arc surface is disposed on a side, facing the rotating ball head, of the press member.

Preferably, a limiting groove is provided on a side, facing the first push member and the second push member, of the press member, and the first push member and the second push member are accommodated inside the limiting groove.

Preferably, an adjustment structure is disposed on the rotating base, and used to adjust a distance between the second push member and the first push member.

Preferably, the adjustment structure includes an adjustment groove provided on the rotating base and an adjustment member that is disposed inside the adjustment groove and abuts against the second push member, an extended distance of the adjustment member into the adjustment groove is adjusted, to adjust the distance between the second push member and the first push member.

Preferably, the adjustment groove is a threaded groove, and the adjustment member is a headless bolt.

A gimbal, including a mounting base and the gimbal locking structure, where the mounting base is connected to the rotating base through a detachable structure, the first push member and the second push member abut against the mounting base, and a shooting device is mounted on the mounting base.

Preferably, the detachable structure is disposed as a threaded connection structure.

The beneficial effect of the present disclosure are as follows: The gimbal locking structure includes a rotating base, a rotating ball head, a press member, a first push member, a second push member, and a lever. The rotating chamber is provided on the rotating base. The rotating ball head is rotationally disposed inside the rotating chamber. The press member is disposed inside the rotating chamber and abuts against the rotating ball head. The first push member and the second push member abut against the press member, a first abutting bevel is disposed on the first push member, and a second abutting bevel that abuts against the first abutting bevel is disposed on the second push member. The lever is rotationally disposed on the rotating base and abuts against the first push member. When the lever is located at the locked position, the lever pushes the first push member and the second push member to move, to resist movement of the press member towards the direction of the rotating ball head, and press against the rotating ball head. Alternatively, when the lever is located in the unlocked position, the lever stops abutting against the first push member, to enable the press member to move in the direction opposite to the rotating ball head, and stop abutting against the rotating ball head. According to the structure, the rotating ball head can be locked and unlocked quickly by triggering the lever, to quickly adjust the shooting angle. Therefore, the present disclosure has desirable practicability.

BRIEF DESCRIPTION OF THE DRAWINGS

The above and/or additional aspects and advantages of the present disclosure will become apparent and readily comprehensible from the description of embodiments in conjunction with the following accompanying drawings.

DETAILED DESCRIPTION OF THE EMBODIMENTS

A specific embodiment of the present disclosure will be described in detail below. A preferred embodiment of the present disclosure is illustrated in the accompanying drawings. The accompanying drawings serve to supplement the text description herein with figures, providing a visual understanding of each technical feature and the overall technical solution of the present disclosure, but cannot be construed as a limitation to the protection scope of the present disclosure.

In the description of the present disclosure, “a plurality of” means two or more; and the terms such as “greater than”, “less than”, and “more than” are construed as exclusive of the numerical value stated, and the terms such as “above”, “below”, and “within” are construed as inclusive of the numerical value stated. The “first” and “second” in the description are merely intended to distinguish technical features, rather than to indicate or imply relative importance or implicitly indicate a number of the indicated technical features or implicitly indicate a sequence relationship of the indicated technical features.

In the description of the present disclosure, it should be understood that orientation or position relationships indicated by terms “upper”, “lower”, “front”, “rear”, “left”, and “right” are orientation or position relationships shown in the accompanying drawings, and these terms are just used to facilitate description of the present disclosure and simplify the description, but not to indicate or imply that the mentioned device or element must have a specific orientation and must be constructed and operated in a specific orientation, and thus cannot be construed as a limitation to the present disclosure.

In the present disclosure, unless otherwise explicitly specified, the terms such as “arrange”, “mount” and “connect” should be broadly understood. For example, they may be a direct connection, or an indirect connection by means of an intermediate medium; may be a fixed connection, a detachable connection or integral molding; may be a mechanical connection; or may be internal communication between two elements or an interactive relationship between two elements. Those skilled in the art may reasonably determine the specific meanings of the above terms in the present disclosure according to the specific contents of the technical solution.

Figure 1:
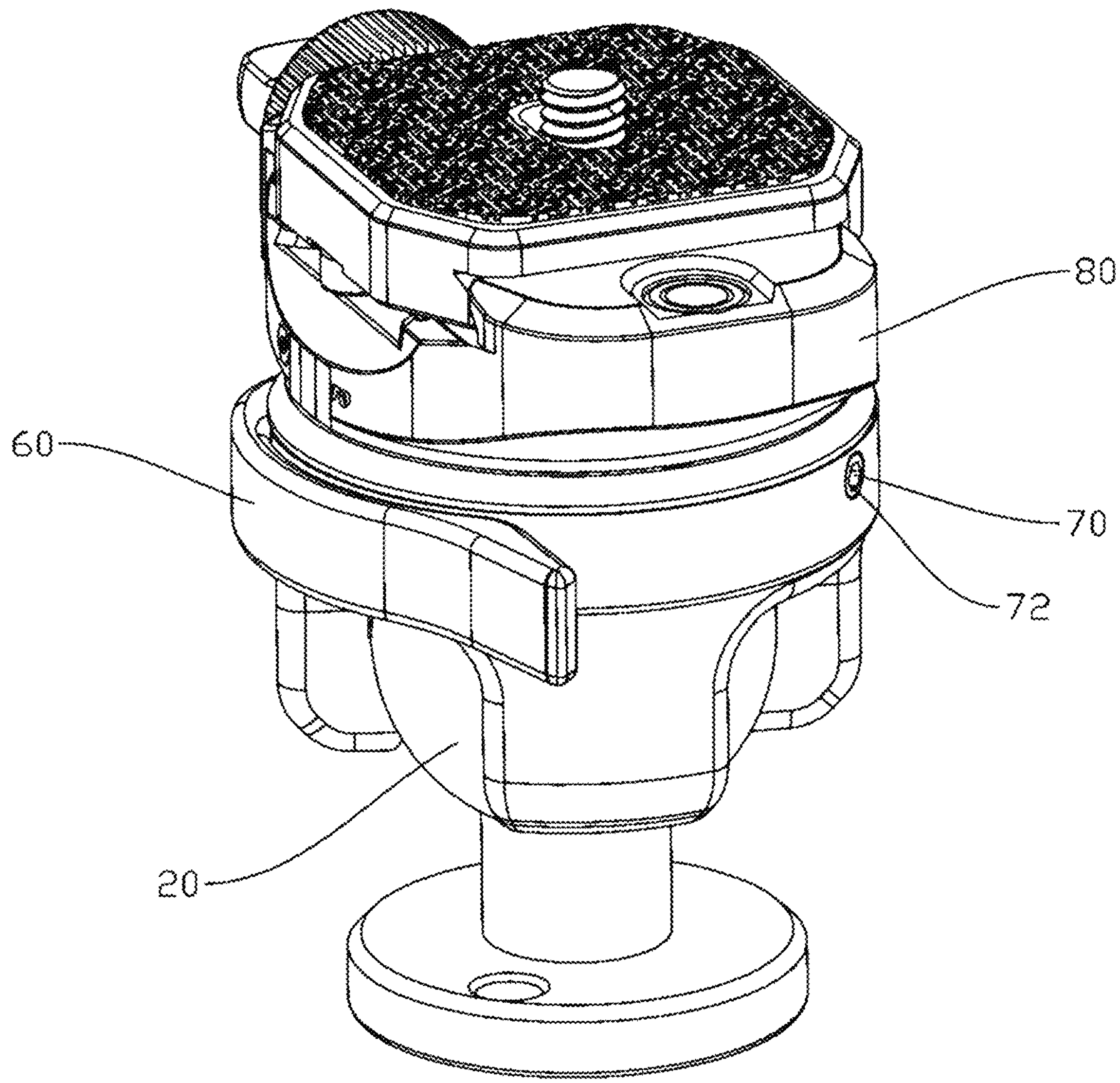
FIG. 1 is a schematic diagram of a structure of a gimbal.
Figure 2:
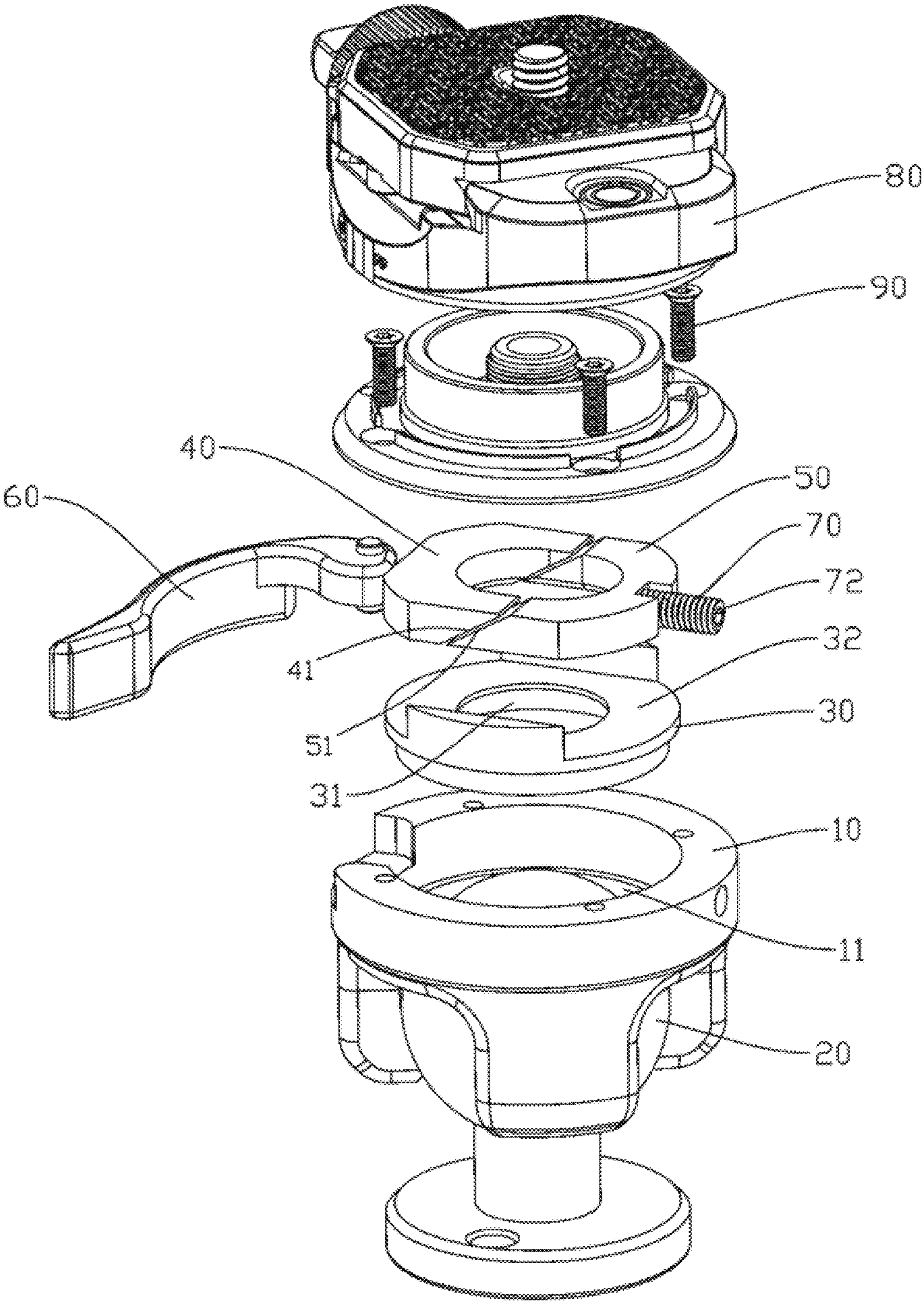
FIG. 2 is an exploded view of a gimbal in an unlocked state.
Figure 3:
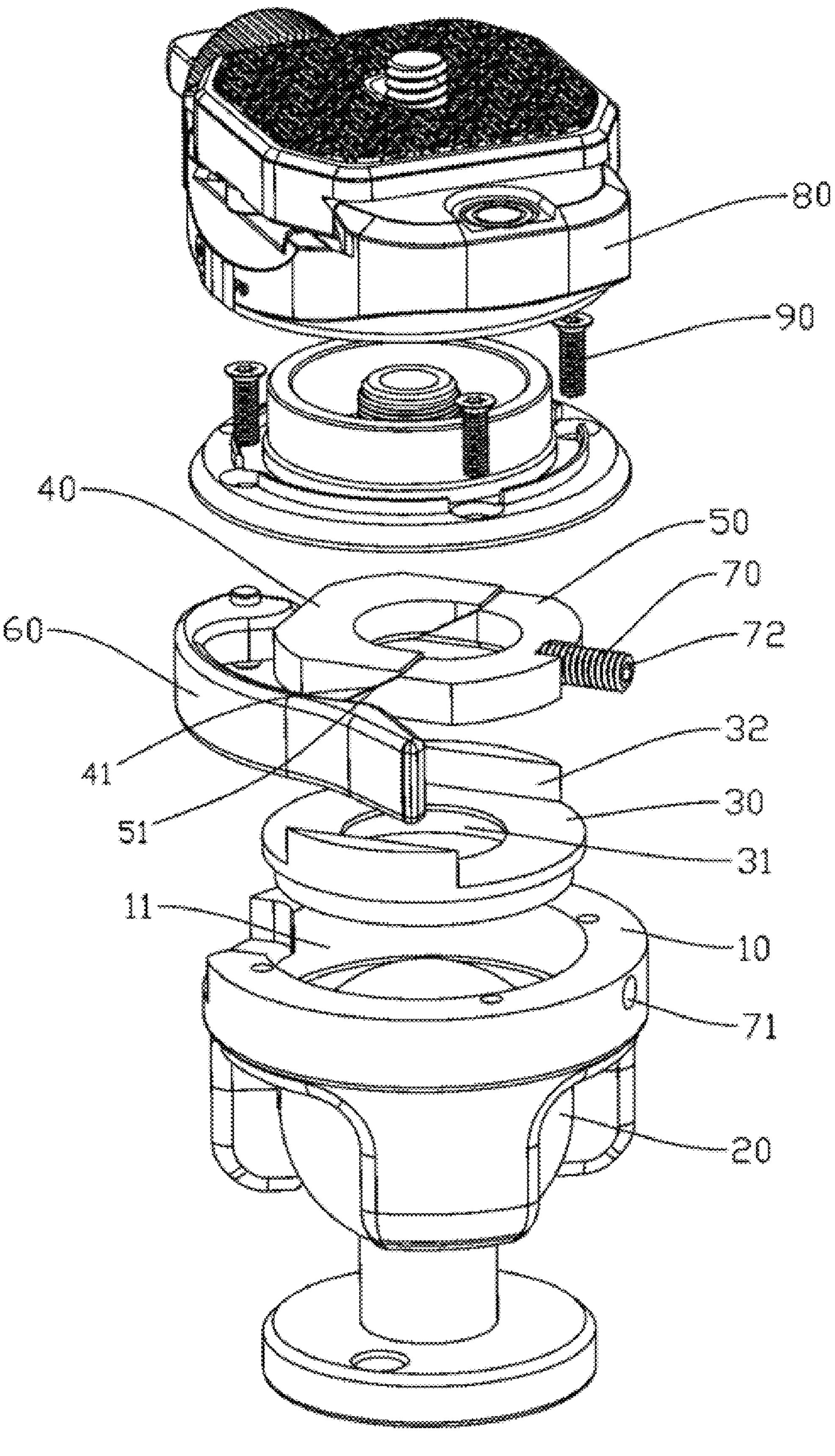
FIG. 3 is an exploded view of a gimbal in a locked state.

Referring to FIG. 1 to FIG. 3, a gimbal locking structure includes a rotating base 10, a rotating ball head 20, a press member 30, a first push member 40, a second push member 50, and a lever 60.

A rotating chamber 11 is provided on the rotating base 10.

The rotating ball head 20 is rotationally disposed inside the rotating chamber 11.

The press member 30 is disposed inside the rotating chamber 11 and abuts against the rotating ball head 20.

The first push member 40 and the second push member 50 abut against the press member 30, a first abutting bevel 41 is disposed on the first push member 40, and a second abutting bevel 51 that abuts against the first abutting bevel 41 is disposed on the second push member 50.

The lever 60 is rotationally disposed on the rotating base 10 and abuts against the first push member 40. When the lever 60 is located at a locked position, the lever 60 pushes the first push member 40 and the second push member 50 to move, to resist movement of the press member 30 to the rotating ball head 20, and press against the rotating ball head 20. Alternatively, when the lever 60 is located in an unlocked position, the lever 60 stops abutting against the first push member 40, to enable the press member 30 to move in a direction opposite to the rotating ball head 20, and stop abutting against the rotating ball head 20.

In the present disclosure, 1. An example in which the gimbal is converted to the locked position from the unlocked position is used for description. When the gimbal is located at the unlocked position, one end of the lever 60 faces outward, to enable the other end of the lever 60 to be separated from the first push member 40. When the shooting angle of the shooting device is adjusted, the one end of the lever 60 is triggered, to enable the lever 60 to rotate inwardly, drive the other end of the lever 60 to abut against the first push member 40, and push the first push member 40 to move towards the direction of the second push member 50 while the lever 60 continuously rotates. The first abutting bevel 41 is disposed on the first push member 40, the second abutting bevel 51 that abuts against the first abutting bevel 41 is disposed on the second push member 50, and the first push member 40 and the second push member 50 abut against the mounting base 80 that is connected to the rotating base 10. Therefore, the first push member 40 and the second push member 50 can move only towards the direction of the rotating ball head 20, to drive the press member 30 to abut against the rotating ball head 20, press against the rotating ball head 20, and limit rotation of the rotating ball head 20. 2. An example in which the gimbal is converted to the unlocked position from the locked position is used for description. When the gimbal is located at the locked position, the one end of the lever 60 faces inward, to enable the other end of the lever 60 to abut against the first push member 40. When the shooting angle of the shooting device needs to be adjusted, the one end of the lever 60 is triggered, to enable the lever 60 to rotate outward, and drive the other end of the lever 60 to be separated from the first push member 40. Therefore, action of an external force on the first push member 40 and the second push member 50 is lost, and loosening occurs, to enable the press member 30 to be separately from the rotating ball head 20, release abutting, and enable the rotating ball head 20 to rotate inside the rotating chamber 11. 3. According to the structure, the rotating ball head 20 can be locked and unlocked quickly by triggering the lever 60, to quickly adjust the shooting angle. Therefore, the present disclosure has desirable practicability.

An abutting arc surface 31 is disposed on a side, facing the rotating ball head 20, of the press member 30. The abutting arc surface 31 is adapted to the rotating ball head 20. Therefore, when the press member 30 moves towards the direction of the rotating ball head 20, rotation of the rotating ball head 20 may be better limited.

A limiting groove 32 is provided on a side, facing the first push member 40 and the second push member 50, of the press member 30, and the first push member 40 and the second push member 50 are accommodated inside the limiting groove 32. The limiting groove 32 may limit movement directions of the first push member 40 and the second push member 50, to improve stability of locking and unlocking.

An adjustment structure 70 is disposed on the rotating base 10, and used to adjust a distance between the second push member 50 and the first push member 40. Due to factors such as a processing tolerance and abrasion during use, a movement distance of the first push member 40 by pushing of the lever 60 is gradually decreased. Therefore, locking effect on the rotating ball head 20 is weakened. The distance between the second push member 50 and the first push member 40 is adjusted through the adjustment structure 70, so that the distance is made up, and the locking effect on the rotating ball head 20 is maintained.

The adjustment structure 70 includes an adjustment groove 71 provided on the rotating base 10 and an adjustment member 72 that is disposed inside the adjustment groove 71 and abuts against the second push member 50, an extended distance of the adjustment member 72 into the adjustment groove 71 may be adjusted, to adjust the distance between the second push member 50 and the first push member 40.

Preferably, the adjustment groove 71 is a threaded groove, and the adjustment member 72 is a headless bolt.

A gimbal includes a mounting base 80 and the head locking structure. The mounting base 80 is connected to the rotating base 10 through a detachable structure 90, the first push member 40 and the second push member 50 abut against the mounting base 80, and a shooting device is mounted on the mounting base 80.

The detachable structure 90 is disposed as a threaded connection structure.

Certainly, the present disclosure is not limited to the above implementation. Equivalent transformations and replacements may be made by those skilled in the art without departing from the spirit of the present disclosure, and shall fall within the scope defined by the claims of the present application.

What is claimed is:

1. A gimbal locking structure, comprising a rotating base (10), a rotating ball head (20), a press member (30), a first push member (40), a second push member (50), and a lever (60), wherein a rotating chamber (11) is provided on the rotating base (10);

the rotating ball head (20) is rotationally disposed inside the rotating chamber (11);

the press member (30) is disposed inside the rotating chamber (11) and abuts against the rotating ball head (20);

the first push member (40) and the second push member (50) abut against the press member (30), a first abutting bevel (41) is disposed on the first push member (40), and a second abutting bevel (51) that abuts against the first abutting bevel (41) is disposed on the second push member (50);

the lever (60) is rotationally disposed on the rotating base (10) and abuts against the first push member (40);

when the lever (60) is located at a locked position, the lever (60) pushes the first push member (40) and the second push member (50) to move, so as to resist movement of the press member (30) to the rotating ball head (20), and so as to press against the rotating ball head (20); or when the lever (60) is located at an unlocked position, the lever (60) stops abutting against the first push member (40), so as to enable the press member (30) to move in a direction opposite to the rotating ball head (20), and so as to stop abutting against the rotating ball head (20); and wherein a limiting groove (32) is provided on a side, facing the first push member (40) and the second push member (50), of the press member (30), and the first push member (40) and the second push member (50) are accommodated inside the limiting groove (32).

2. The gimbal locking structure according to claim 1, wherein an abutting arc surface (31) is disposed on a side, facing the rotating ball head (20), of the press member (30).

3. The gimbal locking structure according to claim 1, wherein an adjustment structure (70) is disposed on the rotating base (10), and used to adjust a distance between the second push member (50) and the first push member (40).

4. The gimbal locking structure according to claim 3, wherein the adjustment structure (70) comprises an adjustment groove (71) provided on the rotating base (10) and an adjustment member (72) that is disposed inside the adjustment groove (71) and abuts against the second push member (50), an extended distance of the adjustment member (72) into the adjustment groove (71) is adjustable, to adjust the distance between the second push member (50) and the first push member (40).

5. The gimbal locking structure according to claim 4, wherein the adjustment groove (71) is a threaded groove, and the adjustment member (72) is a headless bolt.

6. A gimbal, comprising a mounting base (80) and the gimbal locking structure according to claim 1, wherein the mounting base (80) is connected to the rotating base (10) through a detachable structure (90), the first push member (40) and the second push member (50) abut against the mounting base (80), and a shooting device is mounted on the mounting base (80).

7. The gimbal according to claim 6, wherein an abutting arc surface (31) is disposed on a side, facing the rotating ball head (20), of the press member (30).

8. The gimbal according to claim 6, wherein an adjustment structure (70) is disposed on the rotating base (10), and used to adjust a distance between the second push member (50) and the first push member (40).

9. The gimbal according to claim 8, wherein the adjustment structure (70) comprises an adjustment groove (71) provided on the rotating base (10) and an adjustment member (72) that is disposed inside the adjustment groove (71) and abuts against the second push member (50), an extended distance of the adjustment member (72) into the adjustment groove (71) is adjustable, to adjust the distance between the second push member (50) and the first push member (40).

10. The gimbal according to claim 9, wherein the adjustment groove (71) is a threaded groove, and the adjustment member (72) is a headless bolt.

11. The gimbal according to claim 6, wherein the detachable structure (90) is disposed as a bolt connection structure.

* * * * *